(12) United States Patent
Ou

(10) Patent No.: US 7,157,028 B2
(45) Date of Patent: Jan. 2, 2007

(54) METHOD OF MAKING VENTILATIVE INSOLE

(76) Inventor: Jer-Chin Ou, 9F-3, No. 137, Leu-Chwan W. Street, Taichung City (TW)

( * ) Notice: Subject to any disclaimer, the term of this patent is extended or adjusted under 35 U.S.C. 154(b) by 217 days.

(21) Appl. No.: 10/859,117

(22) Filed: Jun. 3, 2004

(65) Prior Publication Data

US 2005/0269723 A1    Dec. 8, 2005

(51) Int. Cl.
*B29C 67/20* (2006.01)
(52) U.S. Cl. ............................. 264/45.5; 264/138
(58) Field of Classification Search ............ None
See application file for complete search history.

(56) References Cited

U.S. PATENT DOCUMENTS

| | | | | |
|---|---|---|---|---|
| 2,287,282 A | * | 6/1942 | Tousley | 264/130 |
| 3,303,250 A | * | 2/1967 | Bingham, Jr. | 264/145 |
| 4,287,143 A | * | 9/1981 | Sears et al. | 264/46.8 |
| 4,731,139 A | * | 3/1988 | Feyerabend et al. | 156/154 |
| 5,141,578 A | * | 8/1992 | Yang | 156/79 |
| 5,308,420 A | * | 5/1994 | Yang | 156/79 |
| 5,318,645 A | * | 6/1994 | Yang | 156/79 |
| 5,350,544 A | * | 9/1994 | Bambara et al. | 264/415 |
| 5,560,877 A | * | 10/1996 | Yung et al. | 264/51 |
| 5,814,254 A | * | 9/1998 | Bisconti | 264/46.4 |
| 5,972,257 A | * | 10/1999 | Liu | 264/40.4 |

* cited by examiner

*Primary Examiner*—Edmund H. Lee
(74) *Attorney, Agent, or Firm*—Browdy and Neimark, PLLC

(57) ABSTRACT

A method of making an insole has the steps: a) Prepare a mold with a cavity therein. The mold has a plurality of protrusions at a portion of a sidewall of the cavity. b) Inject a foaming material into the cavity of the mold. c) Strip the mold to get a piece material with a plurality of pores at a predetermined portion thereof. The piece material has a skin layer on a surface thereof and sidewalls of the pores and the pores form a symmetrical pattern on the piece material. d) Cut a layer of a side of the piece material off to expose ends of the pores. d) Cut the piece material to get the insole.

2 Claims, 9 Drawing Sheets

METHOD OF MAKING VENTILATIVE INSOLE

BACKGROUND OF THE INVENTION

1. Field of the Invention

The present invention relates generally to an insole of a shoe, and more particularly to a method of making a ventilative insole.

2. Description of the Related Art

A conventional ventilative insole is classified into a pore-formed molding type and a mold molding type according to the method of forming the pores of the insole. The first type is that the piece of insole is processed to form the pores after it is molded and the second type is that the insole is molded with the pores by foaming molding method.

In the process of foaming of the foaming material, there is a skin layer molded on a surface of the insole for reinforcement. The advantage of the insole of the first type is that the distribution of pores is designated by manufacturer but it will damage the skin layer while the insole is formed with the pores. Such insole has no skin layer at portions adjacent to the pores that the pores will easy to be damaged after a long time of use. The insole of the second type has a skin layer both on the surface of the insole and the sidewall of the pores. There must be an average distribution of pores on the insole to prevent the insole from break while it is shrunk after foaming.

SUMMARY OF THE INVENTION

The primary objective of the present invention is to provide a method of making a ventilative insole, which is made from a molding method and can mold the pores at a designative portion.

According to the objective of the present invention, a method of making an insole comprises the steps of:

Prepare a mold with a first mold piece and a second mold piece and having cavity therein. The first mold piece has a plurality of protrusions at a portion of a sidewall of the cavity.

Inject a foaming material into the cavity of the mold.

Strip the mold to get a piece material with a plurality of pores at a predetermined portion thereof. The piece material has a skin layer on a surface thereof and sidewalls of the pores and the pores form a symmetrical pattern on the piece material.

Cut a layer of a side of the piece material off to open ends of the pores.

Cut the piece material to get the insole.

DETAILED DESCRIPTION OF THE INVENTION

Figure 1:
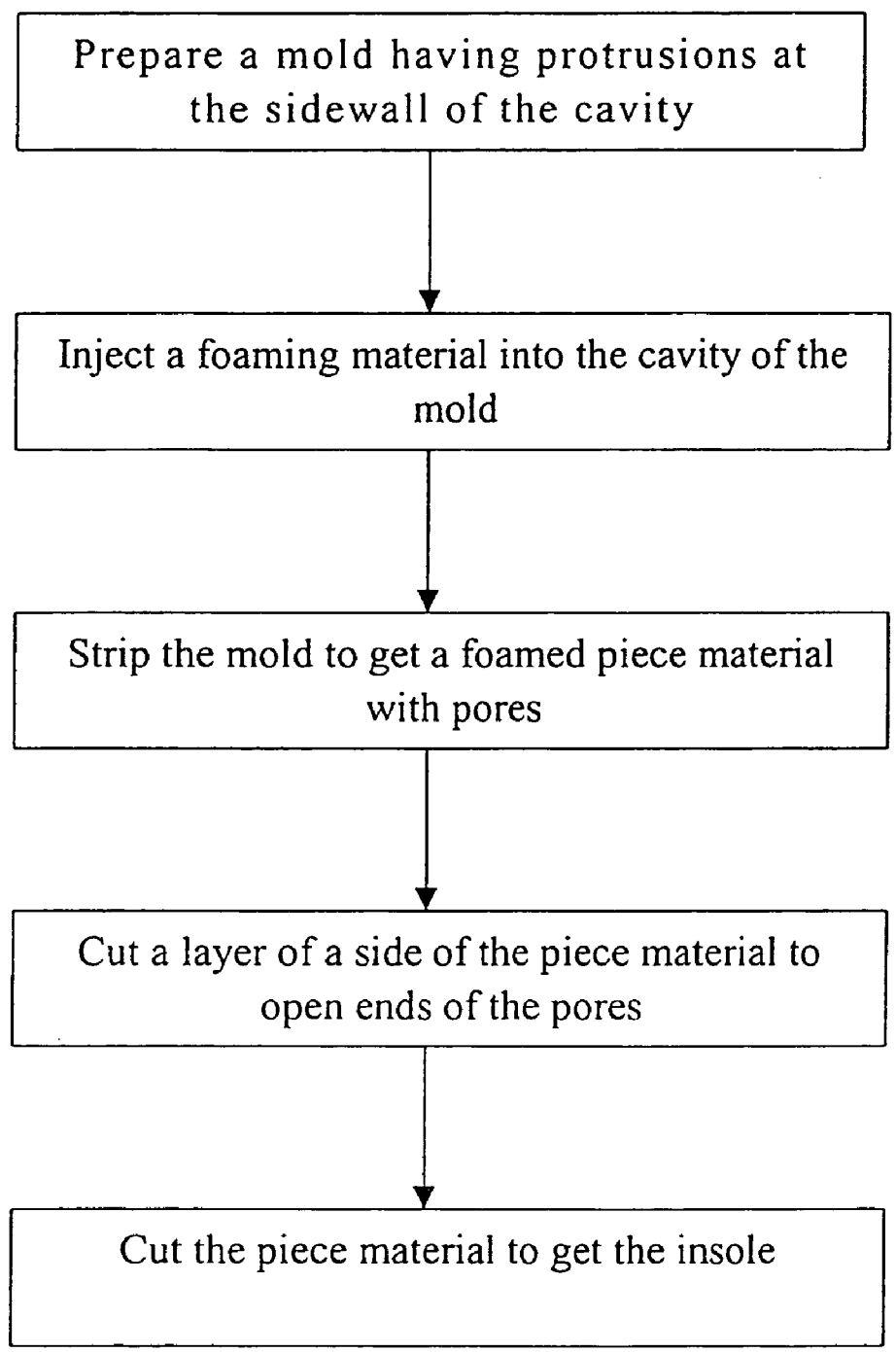
FIG. 1 is a flow chart of a first preferred embodiment of the present invention.
Figure 2:
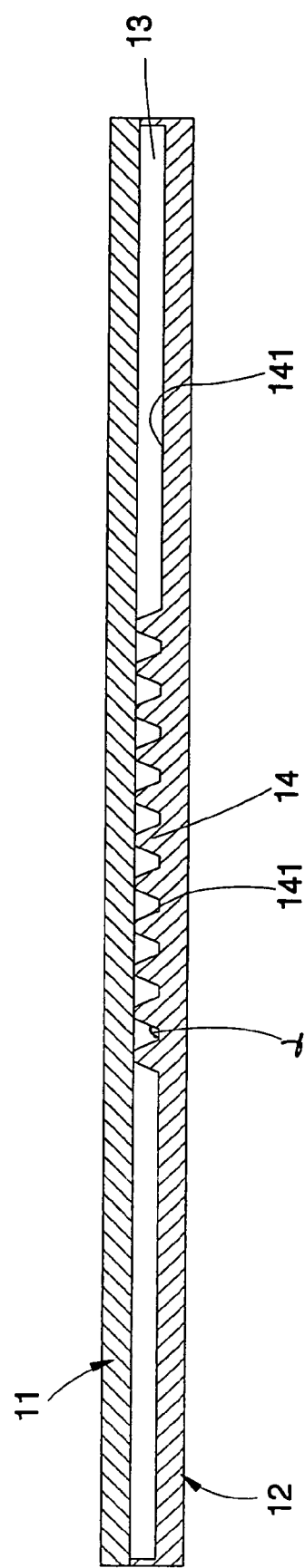
FIG. 2 is a sectional view of the mold of the first step of the preferred embodiment of the present invention.

As shown in FIG. 1, a method of making ventilative insoles of the first preferred embodiment of the present invention comprises the step of: preparing a mold with a first mold piece and a second mold piece, injecting a foaming material into a cavity in the mold, foaming the foaming material into a piece material with a plurality of pores, cutting a skin layer of the piece to expose ends of the pores and cut the piece material into insoles. The ventilative insole made from the method of the present invention is labeled as 10 and the detail of the method of the present invention is described hereunder:

The first step: As shown in FIG. 2, prepare the mold with the first die piece 11 and the second die piece 12 to be detachably engaged with the first die piece 11. The mold has a cavity 13 between the first and the second mold pieces 11 and 12. The first mold piece 11 has a plurality of protrusions 14 at a sidewall 111 of the cavity 13. The protrusions 14 are located at a middle portion of the sidewall 111 so that there are three regions with same area at the sidewall 111. The protrusions 14 are cones in the present preferred embodiment and included angles α between the sidewall 111 and surfaces 141 of the protrusions 14 are about 95 degrees to 150 degrees. The included angles α are designated by manufacturer to get an optimal numbers and distribution of the protrusions 14 on the sidewall 111.

Figure 3:
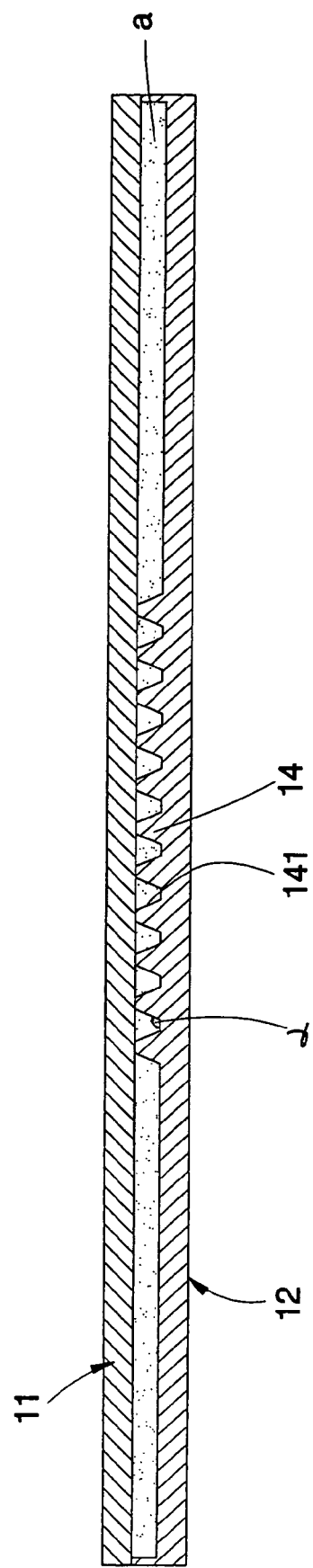
FIG. 3 is a sectional view of the second step of the first preferred embodiment of the present invention, showing the mold being filled with the foaming material.

The second step: As shown in FIG. 3, inject a foaming material α into the cavity 13 of the mold for foam. The foaming material α is made of a material chosen from ethylene vinyl acetate (EVA), polyethylene (PE), polyvinyl chloride (PVC) and so on. It is noted that it is easier for stripping while the included angle α between the sidewall 111 and surfaces 141 of the protrusions 14 is in a range between 95 degrees and 115 degrees and the foaming material α has a ratio of foaming, which is the times of size increasing of the foaming material after foamed, is over 1.5 times. It is more preferred that the ratio of foaming of the foaming material α is in a range between 1.5 times and 2.5 times while the included angle α between 95 degrees and 115 degrees. It is easier for stripping while the included angle α is in a range between 115 degrees and 150 degrees and α ratio of foaming of the foaming material α is under 1.5 times. It is more preferred that the ratio of foaming of the foaming material a is in a range between 1.3 times and 1.5 times.

Figure 4:
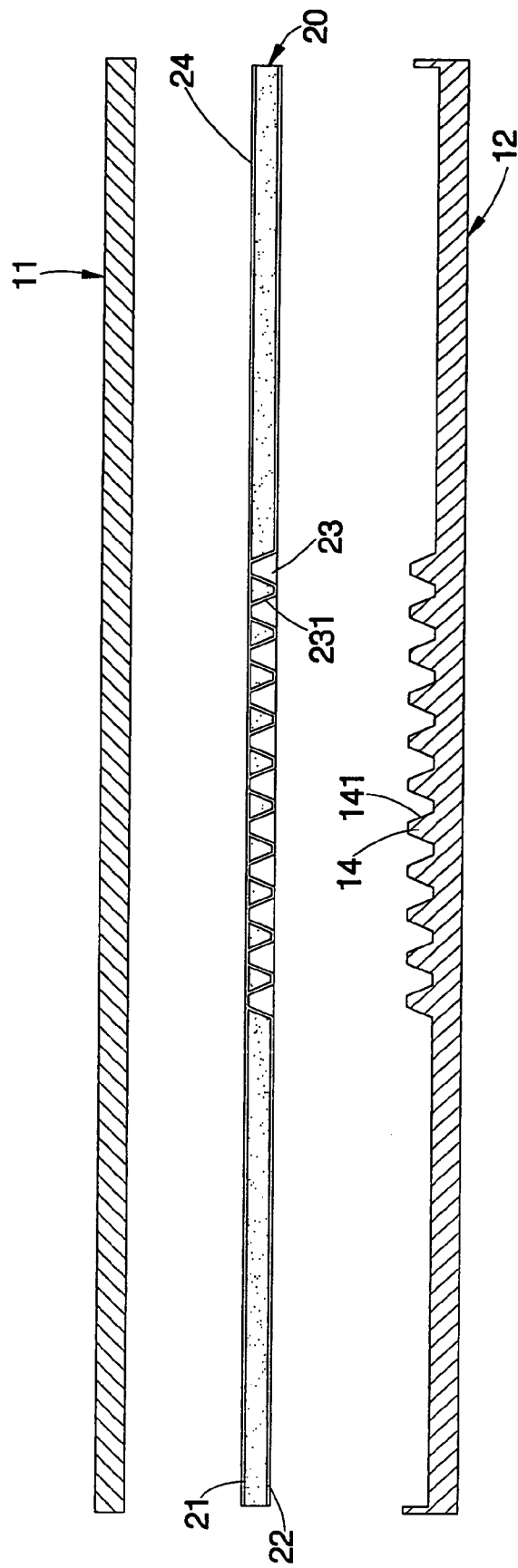
FIG. 4 is a sectional view of the third step of the first preferred embodiment of the present invention, showing the mold being stripped.
Figure 5:
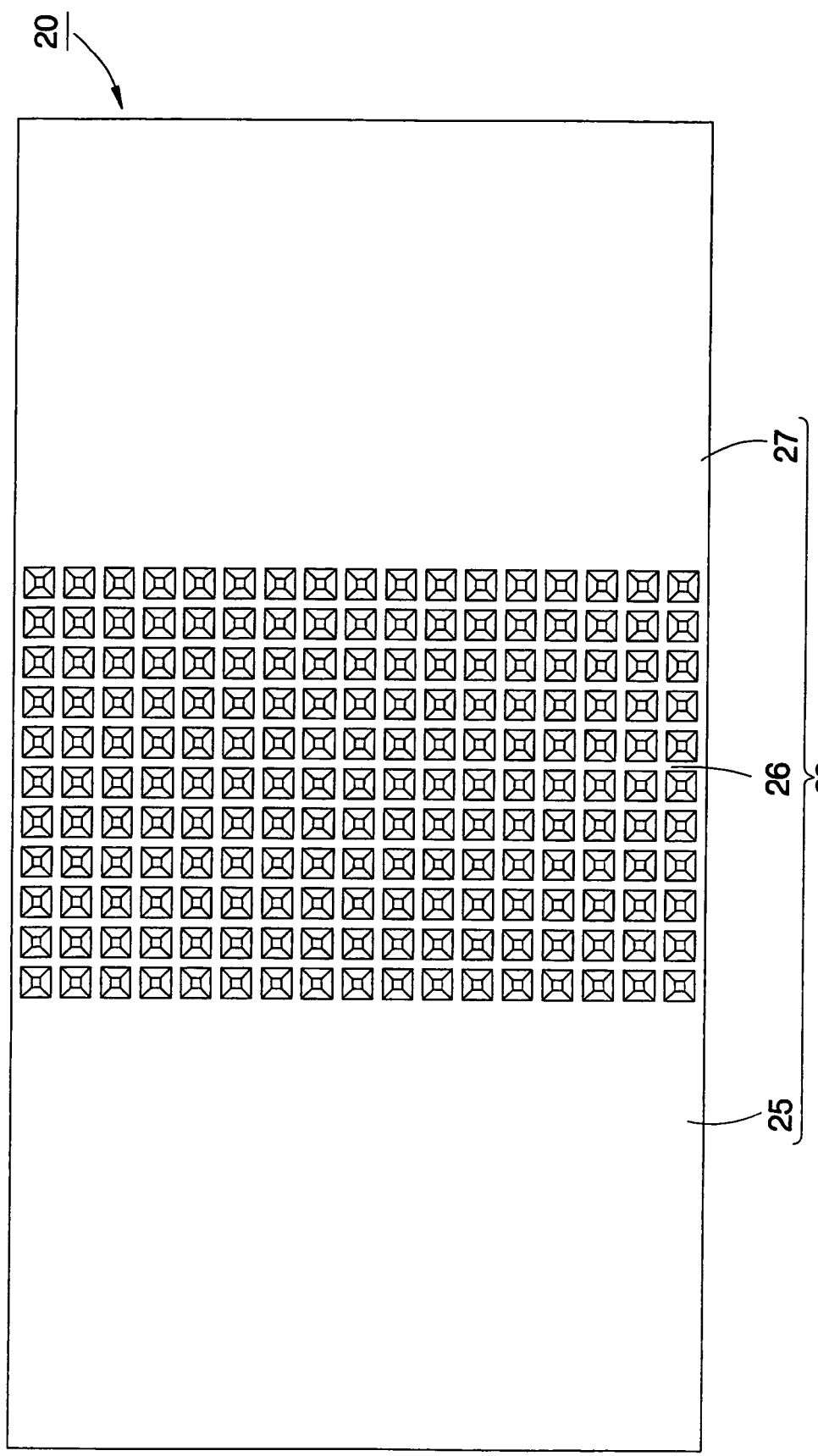
FIG. 5 is a top view of the piece material of the first preferred embodiment of the present invention.

The third step: As shown in FIG. 4, strip the first and second mold pieces 11 and 12 to get a piece material 20 with a plurality of pores 23. The piece material 24 has a hard skin layer 24 on opposite sides 21 and 22 and sidewalls 231 of the pores 23. As shown in FIG. 5, the piece material 24 has three regions 25, 26 and 27 at the side 22 and the pores 23 are distributed at the region 26 at middle so that the side 22 of the piece material 20 has a symmetrical pattern.

Figure 6:
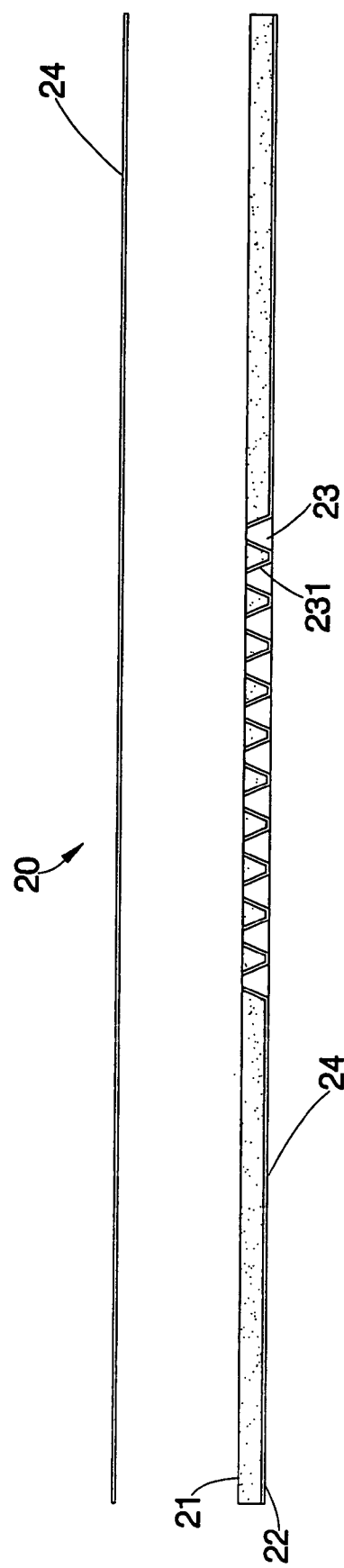
FIG. 6 is a sectional view of the piece material of the fourth step of the first preferred embodiment of the present invention.

The fourth step: As shown in FIG. 6, cut a layer of the piece material 20 off to peel the skin layer 24 on the side 21 and to open ends of the pores 23.

Figure 7:
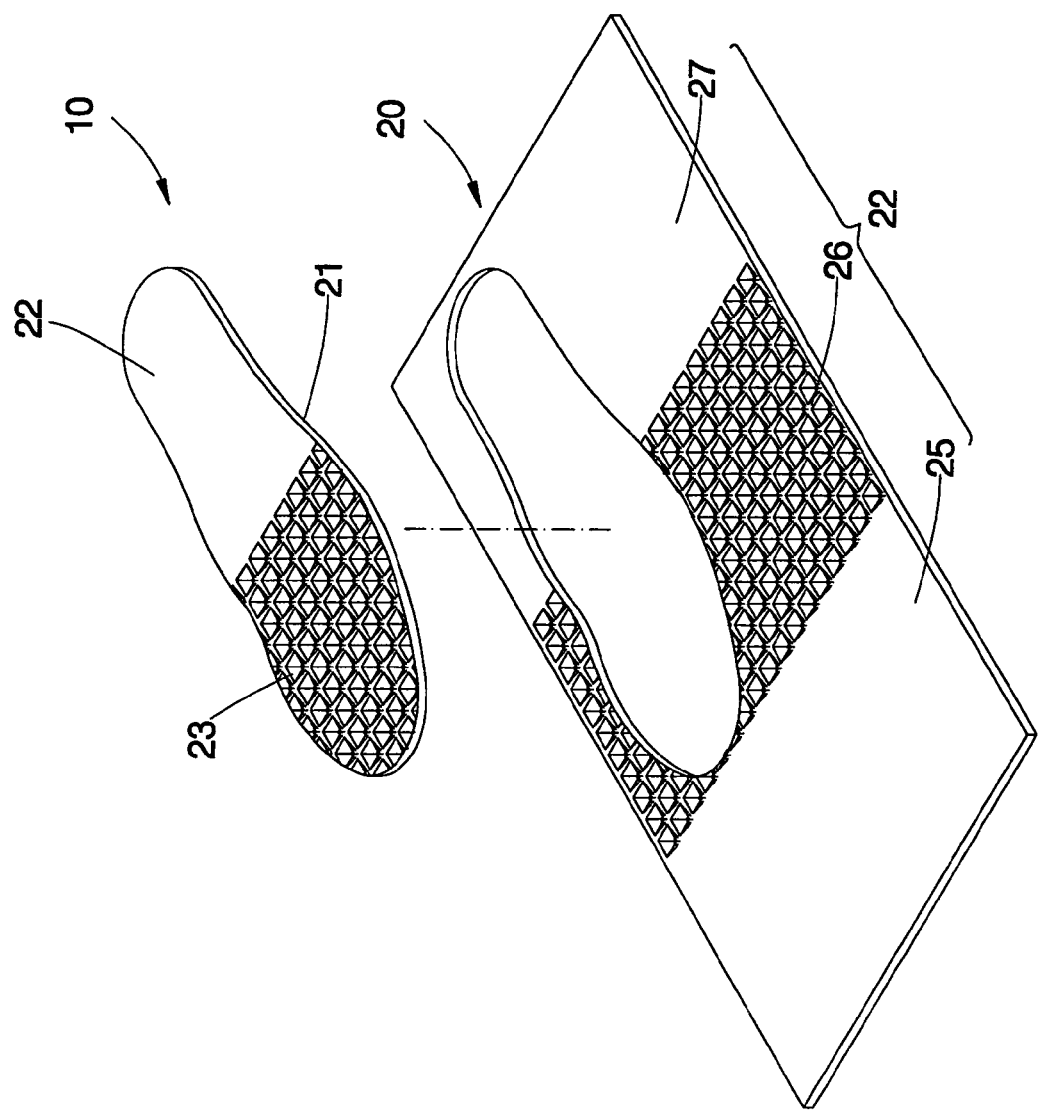
FIG. 7 is a perspective view of the third step of the first preferred embodiment of the present invention, showing the insole being cut from the piece material.

The fifth step: As shown in FIG. 7, cut the piece material 20 into the insole 20.

The insole 10 has a top side 21, a bottom side 22 and the pores 23 open at both sides 21 and 22. The insole 10 has the shin layer 24 at the bottom side 22 and the sidewalls 231 of the pores 23.

The present invention provides the mold having the protrusions 14 to mold the piece material 20 with a symmetrical pattern on the surface thereof, which the region 26 distributed with the pores 23 is located at middle and the regions 25 and 27 without the pores 23 are located at opposite sides of the region 26 respectively. Although the regions 25, 26 and 27 have difference ratios of shrinkage but the symmetrical pattern of the piece material 20 eliminates that, such that the piece material 20 has a flat periphery without warp. In other words, the present invention provides the piece material 20 made from the molding method and having the pores 23 at a designated portion. The piece material 20 is cut at a desirable region to get the insole 10 having the pores 23 at a desirable portion thereof. The insole 10 made from the method of the present invention still keeps the skin layer 24 to prevent the pores 23 from break after a long time of use.

Figure 8:
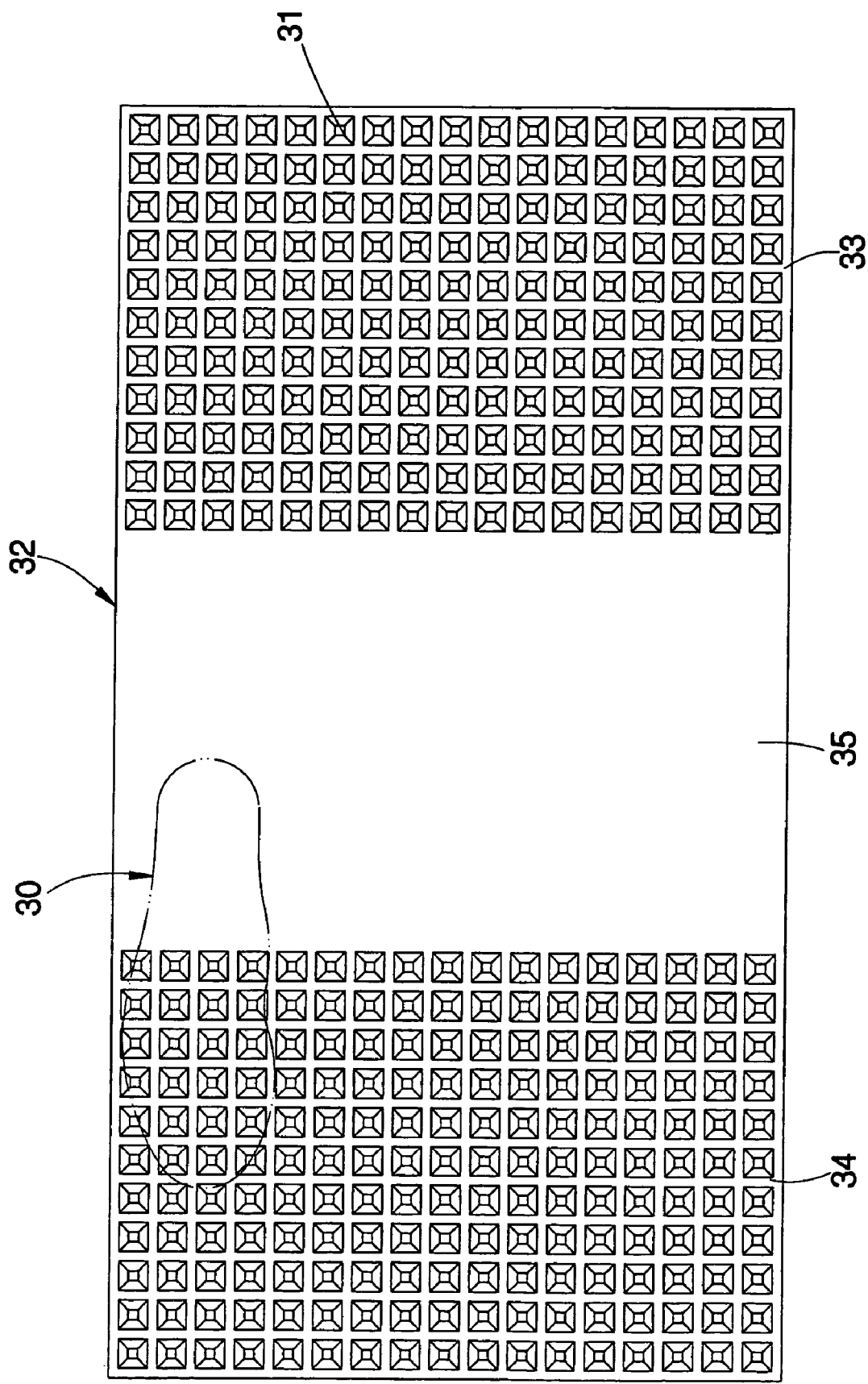
FIG. 8 is a top view of the piece material of a second preferred embodiment of the present invention.

FIG. 8 shows a piece material 32 of the second preferred embodiment of the present invention that a middle region 35 thereof has no pore and regions 33 and 34 at opposite sides of the middle region 35 have pores 31. The piece material 32 is cut to get insoles 30 as the first preferred embodiment does. The piece material 32 of the second preferred embodiment still eliminates the difference ratios of shrinkage of the three regions 33, 34 and 35.

Figure 9:
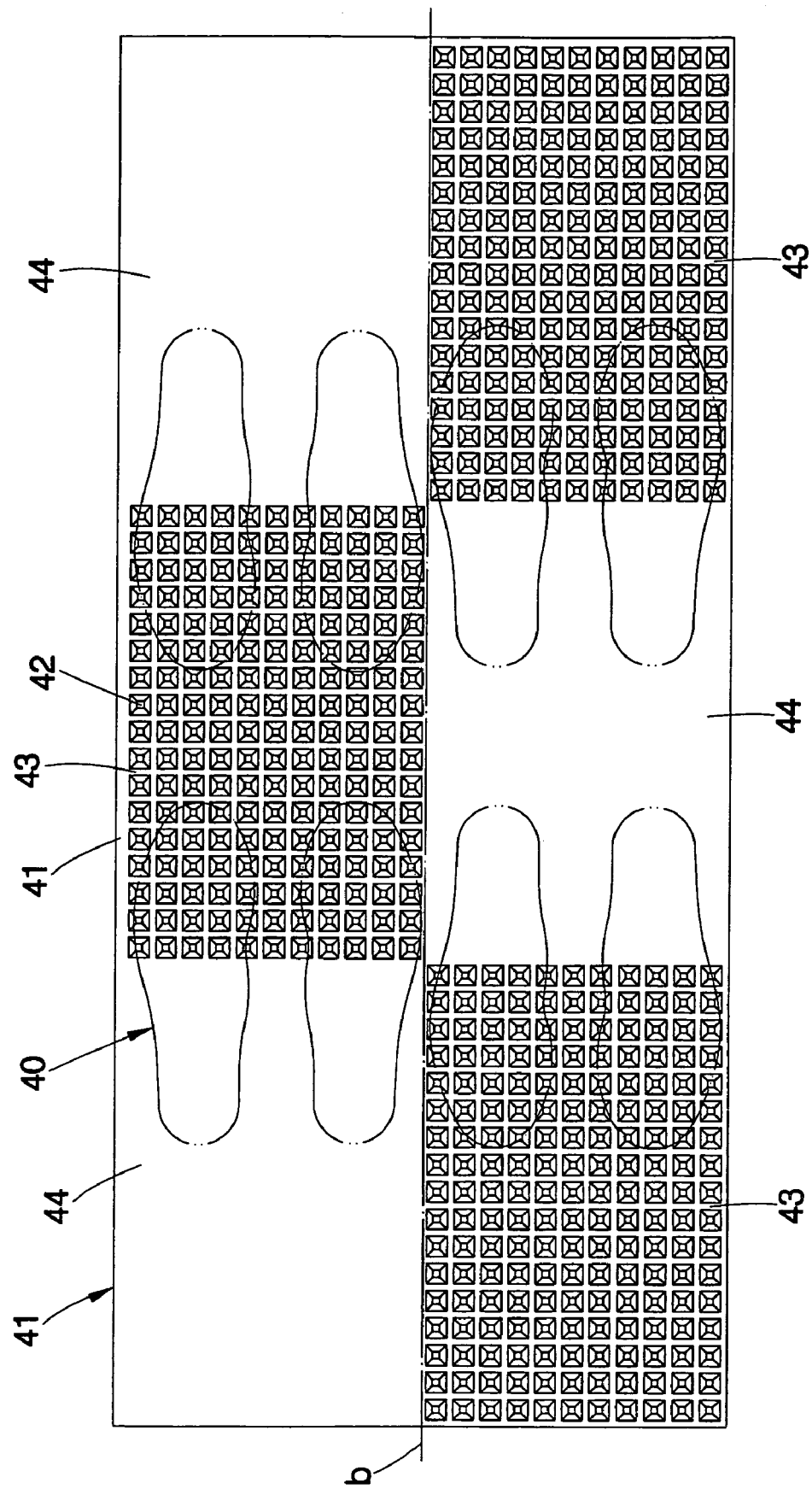
FIG. 9 is a top view of the piece material of a third preferred embodiment of the present invention.

As shown in FIG. 9, a piece material 41 of the third preferred embodiment is divided into six regions. The regions are divided into three upper regions and three lower regions via a line b. In the upper regions, the middle one 43 has pores 42 and the rest two 44 have no pore. In the lower regions, the middle one 44 has no pore and the rest two 44 have pores 42. The piece material 41 is cut to get insoles 40 like aforesaid preferred embodiments do. The piece material of the present invention can be made into another symmetrical patterns to meet the requirement of the present invention.

What is claimed is:

1. A method of making an insole, comprising the steps of:
   preparing a mold with a first mold piece and a second mold piece and having a cavity therein, wherein the first mold piece has a plurality of protrusions at a portion of a sidewall of the cavity;
   injecting a foaming material into the cavity of the mold;
   stripping the mold to get a piece material with a plurality of pores at a predetermined portion thereof, wherein the piece material has a skin layer on a surface thereof and sidewalls of the pores and the pores form a symmetrical pattern on the piece material;
   cutting a layer of a side of the piece material off to open ends of the pores; and
   cutting the piece material to get the insole, wherein included angles between a surface of the protrusions of the first mold piece and the sidewall are in a range between 95 degrees and 115 degrees and a ratio of foaming of the foaming material is over 1.5 times.

2. A method of making an insole, comprising the steps of:
   preparing a mold with a first mold piece and a second mold piece and having a cavity therein, wherein the first mold piece has a plurality of protrusions at a portion of a sidewall of the cavity;
   injecting a foaming material into the cavity of the mold;
   stripping the mold to get a piece material with a plurality of pores at a predetermined portion thereof, wherein the piece material has a skin layer on a surface thereof and sidewalls of the pores and the pores form a symmetrical pattern on the piece material;
   cutting a layer of a side of the piece material off to open ends of the pores; and
   cutting the piece material to get the insole, wherein included angles between a surface of the protrusions of the first mold piece and the sidewall are in a range between 115 degrees and 150 degrees and a ratio of foaming of the foaming material is under 1.5 times.

* * * * *